United States Patent [19]
Matsufuji

[11] Patent Number: 5,394,699
[45] Date of Patent: Mar. 7, 1995

[54] AXLE DRIVING APPARATUS

[75] Inventor: Mizuya Matsufuji, Sanda, Japan

[73] Assignee: Kanzaki Kokyukoki Mfg. Co., Ltd., Hyogo, Japan

[21] Appl. No.: 66,214

[22] Filed: May 25, 1993

[51] Int. Cl.⁶ .................... F16D 31/02; F16D 39/00
[52] U.S. Cl. ........................ 60/442; 60/487; 188/71.4
[58] Field of Search .............. 60/435, 442, 487; 74/371; 192/93 A; 188/71.4, 72.8, 72.7

[56] References Cited

U.S. PATENT DOCUMENTS

| | | | |
|---|---|---|---|
| 3,693,763 | 9/1972 | Powilleit | 188/71.4 |
| 4,464,898 | 8/1984 | Aoyagi et al. | 60/442 X |
| 4,550,810 | 11/1985 | Price et al. | 188/71.4 |
| 4,858,435 | 8/1989 | Ikeda | 60/442 X |
| 4,932,209 | 6/1990 | Okada et al. | 60/487 |
| 5,000,056 | 3/1991 | Crawford et al. | 74/371 |
| 5,012,901 | 5/1991 | Campbell et al. | 188/71.4 |
| 5,040,649 | 8/1991 | Okada | 192/4 A |
| 5,078,659 | 1/1992 | Von Kaler et al. | 475/78 |
| 5,090,949 | 2/1992 | Thoma et al. | 475/83 |

*Primary Examiner*—Edward K. Look
*Assistant Examiner*—Hoang Nguyen
*Attorney, Agent, or Firm*—Larson and Taylor

[57] ABSTRACT

An axle driving apparatus wherein a brake disk is fixed to one of the output shaft of a hydraulic motor and a rotary shaft of a power transmission, and the disk, and a brake disk and an actuator cooperative therewith are held immersed in oil retained in a housing. The advantage of compactness of the disks is utilized, and the disks are given improved durability by being immersed in the oil for cooling and suppression of heat generation.

6 Claims, 7 Drawing Sheets

AXLE DRIVING APPARATUS

FIELD OF INDUSTRIAL APPLICATION

The present invention relates to an axle driving apparatus of the hydrostatic transmission type having a brake device, and more particularly to an axle driving apparatus for transmitting a drive force from a main vehicle body having an engine to the axle of a working vehicle via a hydrostatic speed-variable transaxle.

PRIOR ART

Axle driving apparatuses of the hydrostatic transmission type are already known which have a brake device. Such an apparatus consists basically of an input shaft drivable by the drive shaft of a main vehicle body, a hydraulic pump drivable by the input shaft, a hydraulic motor drivable by pressure oil delivered from the hydraulic pump, a power transmission operatively connecting the output shaft of the hydraulic motor to an axle of a working vehicle, and a housing accommodating these components. The brake device is provided so as to act on the output shaft of the hydraulic motor or a shaft of the power transmission. However, when the brake device is of the drum type, the device has the drawback of occupying a large space and making the overall axle driving apparatus large as disclosed in the U.S. Pat. No. 5,040,649. Alternatively when the brake device is of the disk type as disclosed in the U.S. Pat. Nos. 5,078,659 and 5,090,949, the disks can be manufactured at low costs but are provided outside the housing, as mounted on a shaft projecting out from the housing, and are therefore liable to wear owing to heat generation since cooling action is not sufficiently available, and liable to damage due to the ingress of extraneous matter and consequently require frequent maintenance.

SUMMARY OF THE INVENTION

An object of the present invention is to overcome these problems of the prior aft and to provide an axle driving apparatus having a brake device which is compact and excellent in braking ability and in durability.

To fulfill this object, the present invention provides an axle driving apparatus which comprises a hydraulic pump having an input shaft drivingly rotatable for delivering pressure oil, a hydraulic motor drivable with the pressure oil from the hydraulic pump, a housing supporting an axle as immersed in oil retained inside thereof, a power transmission for operatively connecting an output shaft of the hydraulic motor to the axle, and a brake device accommodated in the housing, the brake device comprising a brake disk fixed to and rotatable with one of the output shaft of the hydraulic motor and a rotary shaft of the power transmission, a pressure disk disposed at one side of the brake disk and fixed to the housing, an actuator disposed on the other side of the brake disk and supported by the housing so as to be movable in a direction along the shaft having the brake disk fixed thereto, and a brake operating shaft supported by the housing and operable for moving the actuator to press the brake disk against the pressure disk, the brake disk, the pressure disk and the actuator being immersed in the oil retained within the housing.

According to a preferred mode of the present invention, the actuator is operatively connected to the brake operating shaft so as to be rotatable about the axis of the disk-having shaft, and a cam mechanism is provided for moving the actuator toward the brake disk with the rotation of the actuator. This renders the brake device simple in construction and easy to assemble.

According to another preferred mode of the invention, the housing comprises two portions separable along a plane containing the axis of the disk-having shaft, and the pressure disk of the brake device and a stationary member are fixed to the housing by being held between the two portions. This renders the brake device simpler in construction and easier to assemble.

According to another preferred mode of the invention, the brake operating shaft extends orthogonal to the disk-having shaft and projects upward beyond the housing. The disk-having shaft is therefore given only a length required for the braking action and need not have a length for the braking operation. This makes the brake device compact.

According to still another preferred mode of the invention, the hydraulic motor is of the axial plunger piston type wherein pistons are movable into contact with a slanting surface formed by the stationary member, and the cam mechanism is provided on the actuator and on a portion of the stationary member on opposite side to the slanting surface forming portion thereof. The brake device can be operated by a compacted mechanism which is easy to assemble.

Other objects, features and advantages of the present invention will become more apparent from the embodiment to be described below with reference to the drawings.

EMBODIMENT

Figure 1:
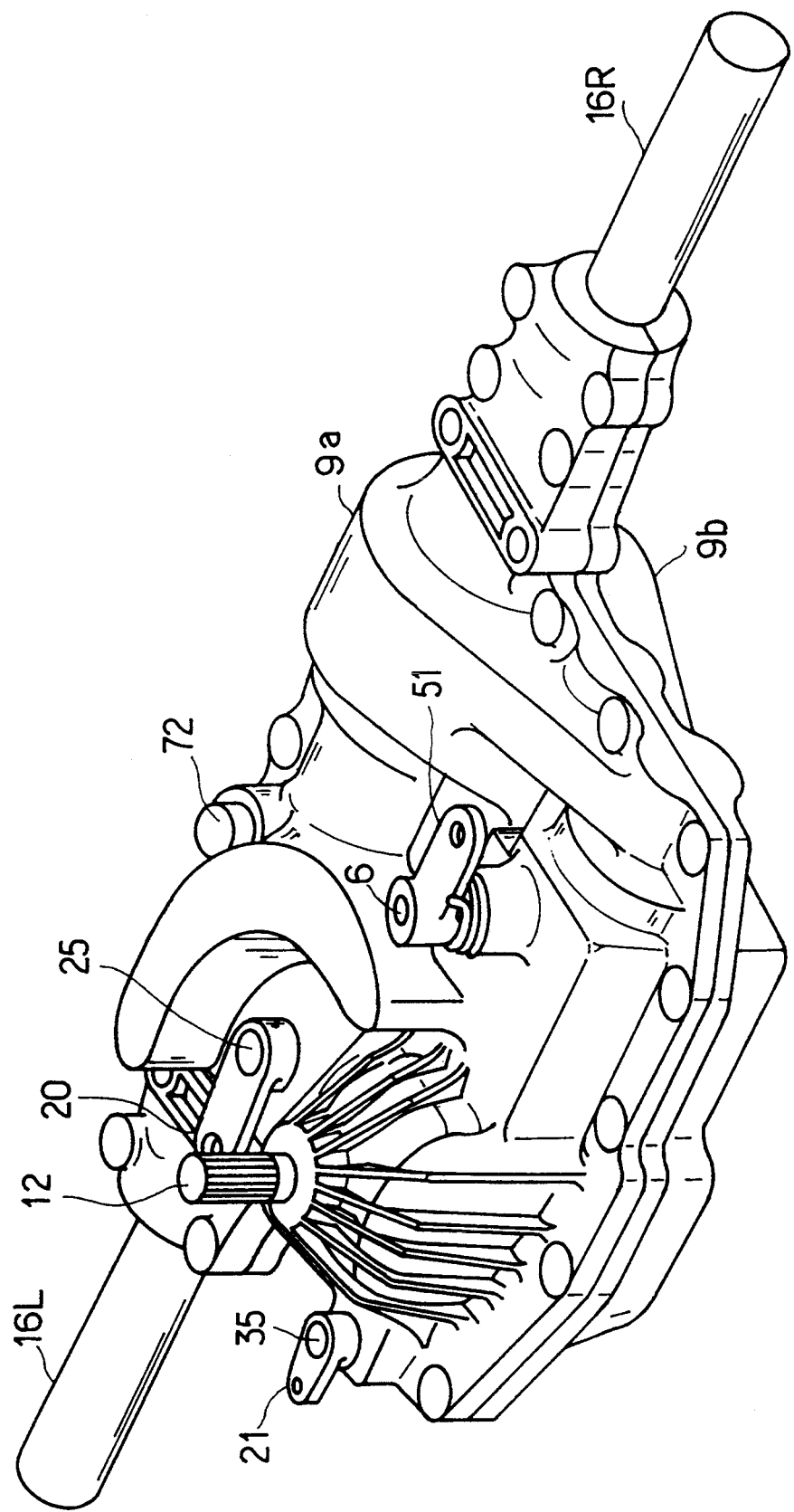
FIG. 1 is a perspective view of an axle driving apparatus embodying the invention.

FIG. 1 shows an axle driving apparatus embodying the present invention. As shown in FIG. 1, a housing 9 has projected therefrom three operating shafts, i.e., a brake operating shaft 6, a speed change operating shaft 25 and a bypass operating shaft 35. A brake arm 51 is attached to the brake operating shaft 6 and linked by a connecting rod to brake operating means (not shown) such as a brake pedal of a vehicle. The speed change operating shaft 25 has a speed change arm 20 attached thereto and linked by a connecting rod to speed change operating means such as a pedal of the vehicle. The bypass operating shaft 35 has a bypass operating arm 21 attached thereto and connected by a rod or wire to a bypass opening lever disposed in the vicinity of an operator's operating position.

Figure 2:
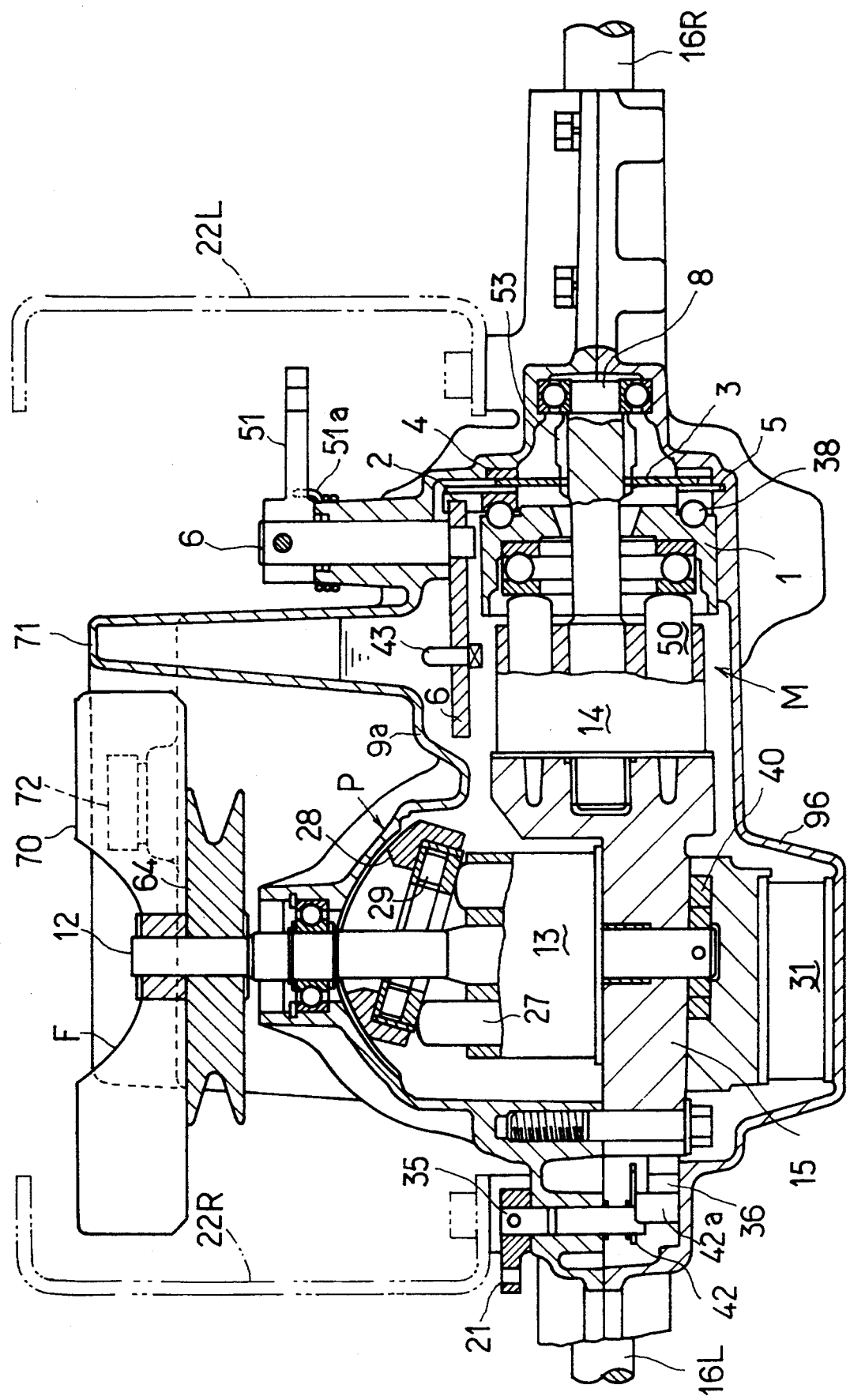
FIG. 2 is a front view showing the apparatus in longitudinal section along the input shaft thereof and a brake operating shaft.
Figure 3:
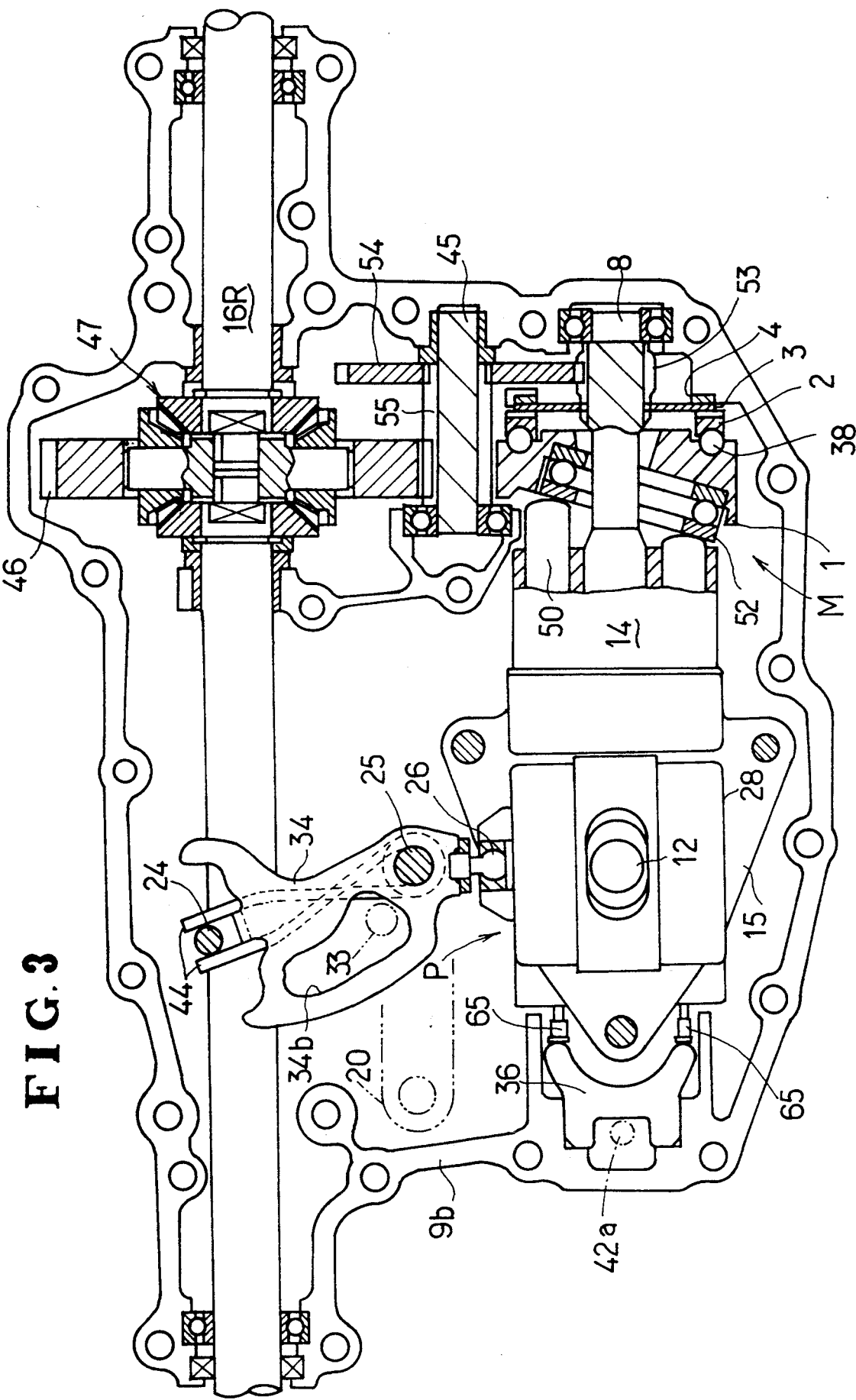
FIG. 3 is a plan view showing the apparatus partly in section with an upper housing portion removed.

The internal construction of the axle driving apparatus will be described next. With reference to FIGS. 2 and 3, the housing 9 comprises upper and lower two divided portions, i.e., and upper housing portion 9a and a lower housing portion 9b. Axles 16L, 16R, the output shaft 8 of hydraulic motor M, and an intermediate shaft 45 for a train of gears for coupling the output shaft to the axles are arranged with their axes positioned in the plane of a joint between the housing portions 9a, 9b. A center support 15 generally L-shaped in vertical section is fastened to the upper housing portion 9a with bolts from below. A hydraulic pump P and the hydraulic motor M, which constitute a hydraulic speed change device, respectively have an input shaft 12 extending vertically and the above-mentioned output shaft 8 which extends horizontally. These shafts 12, 8 are rotatably supported by the center support 15. The hydraulic pump P is of the axial plunger piston type comprising the input shaft 12 fixedly carrying a pulley 64 thereon, a cylinder block 13 rotatable by the input shaft 12, and a plurality of pistons 27 projecting from the cylinder block 13 and slidable to project by a viriable length. The part of the upper housing portion 9a having the input shaft 12 inserted therethrough bulges upward to a curved form, and a movable swash plate 28 has a back surface in contact with the curved part. By being biased upward by a spring force, each piston 27 has its head held in contact with a thrust bearing 29 supported by the swash plate 28. As shown in FIG. 3, the movable swash plate 28 is formed in its side face with an engaging cavity. A speed change lever plate 34 connected to the speed change operating shaft 25 has a ball joint 26 engaging in the cavity. The swashplate 28 is movable rightward or leftward in FIG. 2 by the lever plate 34 through the ball joint 26, and is therefore movable along the curved part (recessed inner surface) of the upper housing portion 9a to incline at varying angles. The variation in the angle of the swash plate 28 alters the stroke length of each piston, consequently varying the amount of pressure oil to be discharged from the hydraulic pump P. Further when the direction of inclination of the movable swash plate 28 relative to the piston reverses, the direction of flow of the pressure oil discharged from the pump P reverses. A torque spring 44 is in engagement with the speed change lever plate 34. The spring 44 is wound around the speed change shaft 25, extends across itself and has opposite end portions in engagement with a lug of the lever plate 34, the extremities of the spring being in engagement with a stopper 24 fixed to the upper housing 9a. Accordingly, when the speed change pedal or the like exerts a torque on the speed change shaft 25, the speed change lever plate 34 turns with the shaft 25 about its axis, moving one end portion of the spring 44 out of engagement with the stopper 24, whereas when the shaft 25 is relieved of the torque, the spring end portion returns into contact with the stopper, whereby the lever plate 34 is returned to the original neutral position.

The pressure oil discharged from the hydraulic pump P passes through a closed circuit in the center support 15 and is supplied to the hydraulic motor M in circulation. The hydraulic motor M is of the axial plunger piston type comprising the above-mentioned output shaft 8, a cylinder block 14, a plurality of pistons 50 slidably fitting in the cylinder block 14 and projectable therefrom by a variable length, and a stationary plate 1 fixed to the housing 9 and holding a thrust bearing 52 as slanted therein. The output shaft 8 is formed with a gear 53 meshing with a large gear 54 integral with the intermediate shaft 45. A small gear 55 fixedly mounted on the intermediate shaft 45 is in mesh with a differential ring gear 46. The differential ring gear 46 is provided inside thereof with a differential gear device 47, which differentially couples the right and left axles 16R and 16L together. A power transmission route is provided by the gear 53 of the output shaft 8, large gear 54, small gear 55 and differential gear 46.

Figure 5:
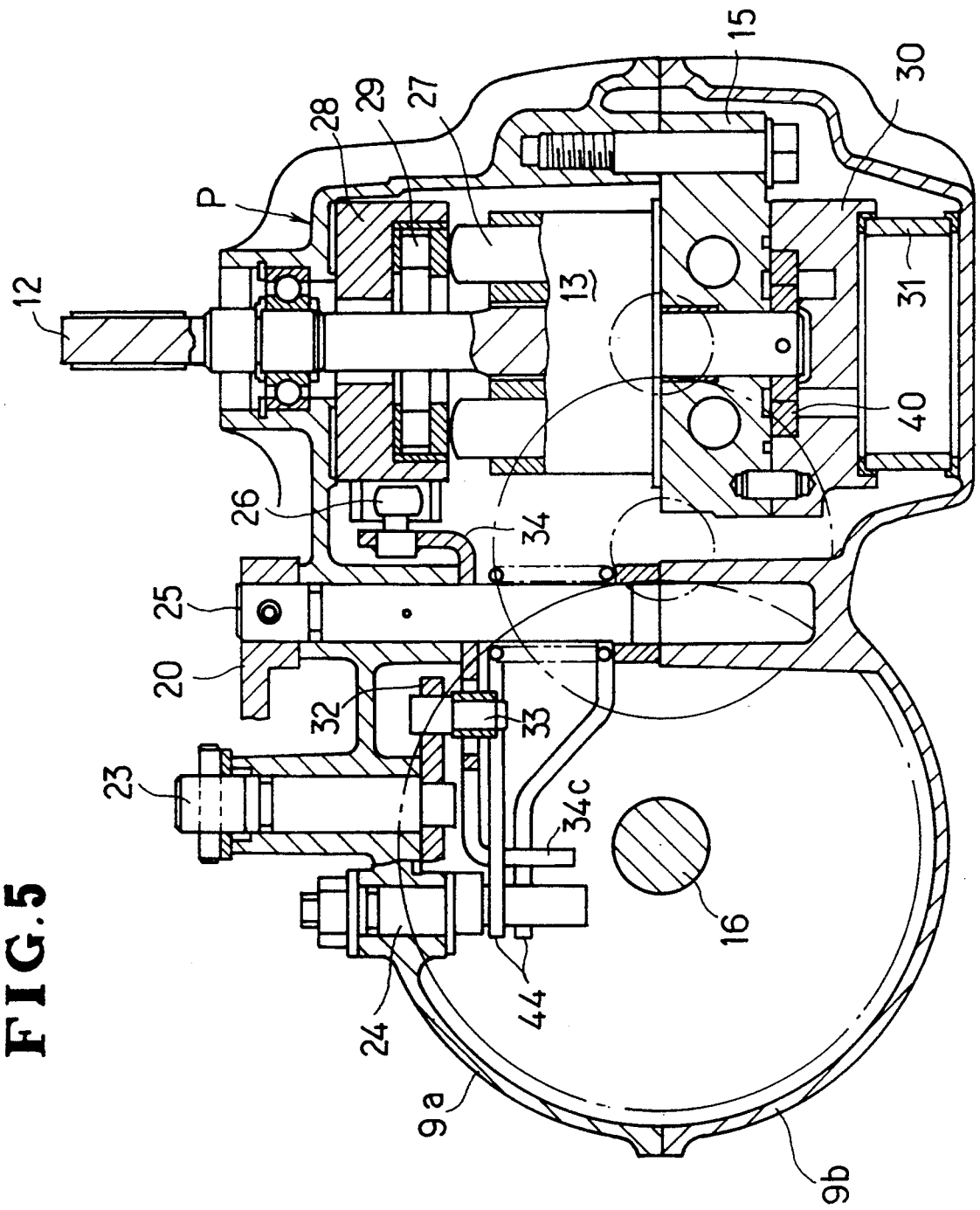
FIG. 5 is a side elevation in vertical section of the apparatus.

With reference to FIG. 5, fixed to the bottom side of the center support 15 is a charge pump casing 30 housing a trochoid type charge pump 40. The charge pump 40 is driven by the input shaft 12 for sucking the oil within the casing through a filter 31. The hydraulic oil cleaned by the filter 31 and discharged from the charge pump 40 is fed to the circuit of the hydrostatic transmission when the bypass valves 65, 65 to be described below open.

Figure 6:
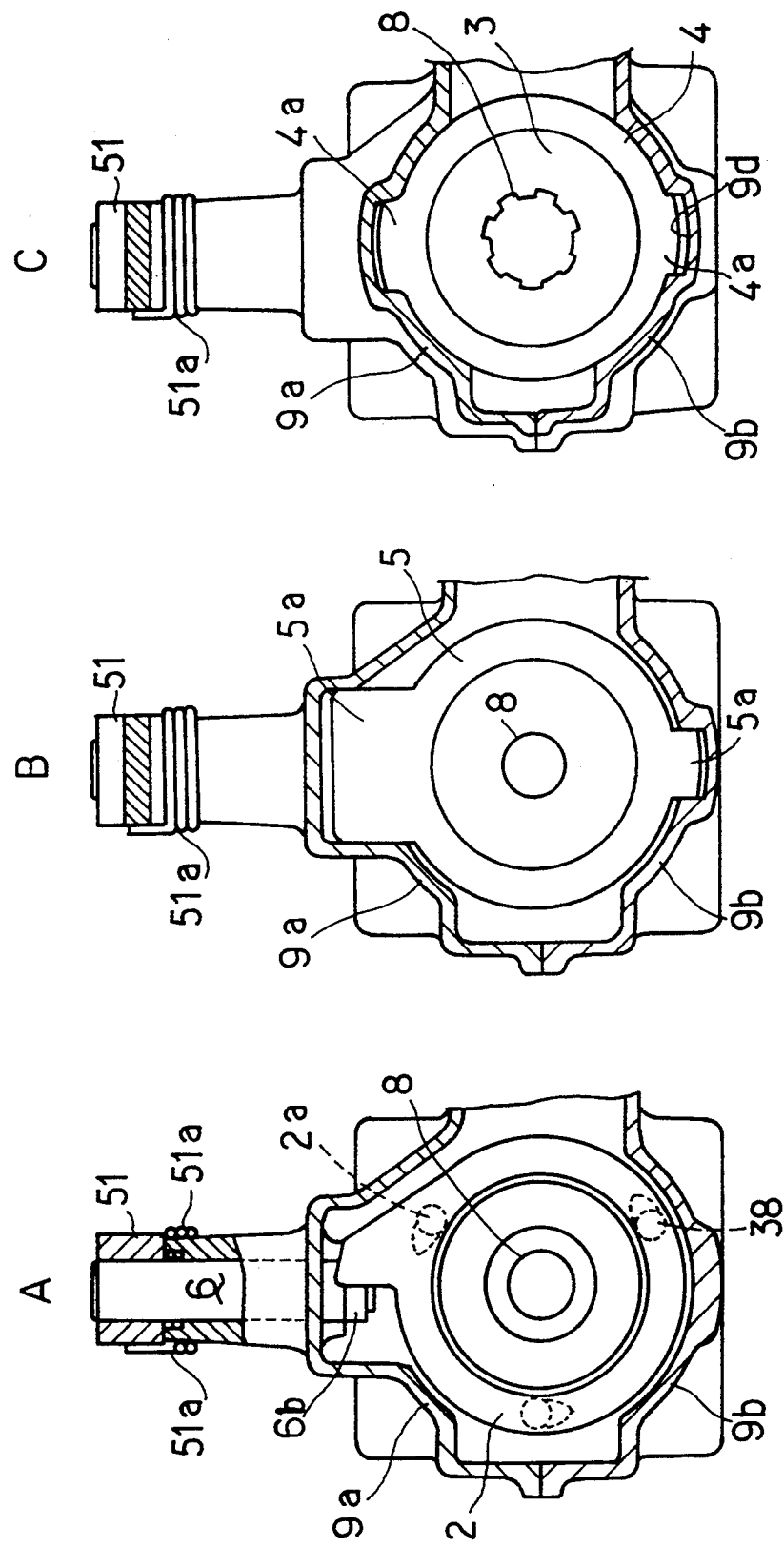
FIG. 6, A, B and C are views in section of the brake device and the vicinity thereof to show an actuator, a pressure disk close to the actuator and another pressure disk remote from the actuator, respectively.
Figure 7:
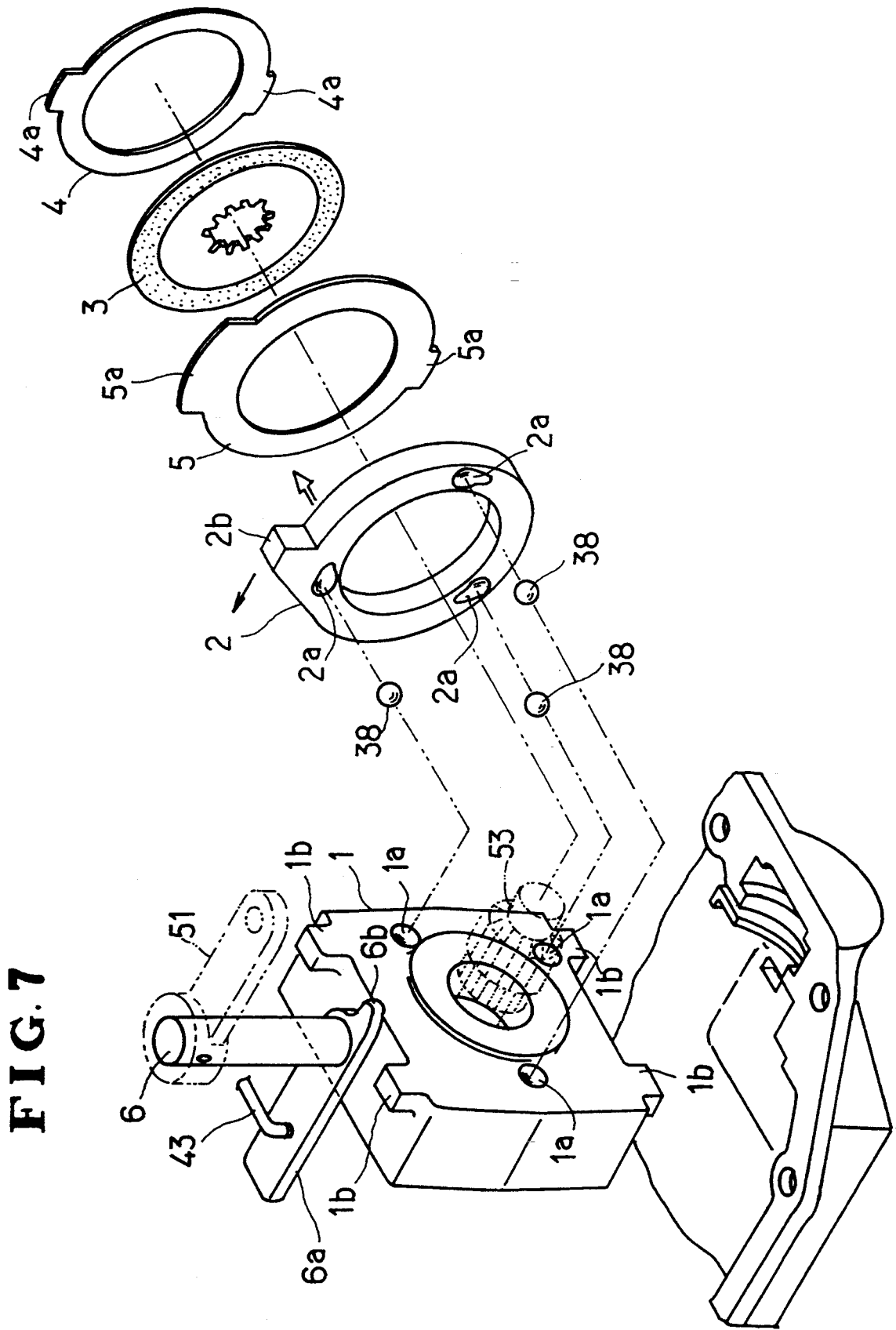
FIG. 7 is an exploded view of the brake device and the vicinity thereof.

Next, a brake device will be described, which is shown in the right-hand side of FIGS. 2 and 3. An actuator 2, pressure disk 5, brake disk 3 and pressure disk 4 are successively arranged on the right side of the stationary plate 1 which is generally square. As shown in FIG. 7 shallow cavities 1a, each defined by a portion of a spherical surface, are formed in the right end face of the stationary plate 1. The actuator 2 is in the form of a ring having an outside diameter approximately equal to the length of one side of the stationary plate 1, and is formed with cam grooves 2a in its surface opposed to the stationary plate 1. Each of the cam grooves 2a is in the form of a drop and includes a large-diameter portion which continuously changes into a small-diameter portion. The large-diameter portion is deeper than the small-diameter portion. Cam balls 38 are held between the stationary plate 1 and the actuator 2, each as trapped in each cavity 1a and the corresponding cam groove 2a. While the brake device is out of operation, the cam ball 38 is positioned in the large-diameter portion of the cam groove 2a. As shown also in FIG. 6, A, the brake operating shaft 6 is supported by the upper housing portion 9a above the brake device so as to extend in a direction approximately orthogonal to the output shaft 8. Inside the upper housing portion 9a, an inner brake arm 6a (FIG. 7) is fixed to the brake operating shaft 6 and biased in a brake nonoperative direction by a return spring 51a. The inner brake arm 6a includes a long portion and a short portion on the respective opposite sides of the shaft 6. The short arm portion has an outer end providing an engaging lug 6b. The actuator 2 has at its upper end a projection 2b in engagement with the lug 6b.

The brake disk 3 has a toothed inner periphery 3a defining a center hole and meshing with the output shaft 8, and is rotatable with this shaft. As shown in FIGS. 6, B and C, each of the pressure disks 4 and 5 is in the form of a ring having approximately the same diameter as the actuator 2 and has upper and lower projections 4a (5a) engaged in recesses formed in the upper housing portion 9a and the lower housing portion 9b, respectively, whereby the pressure disk is locked to the housing 9.

When the inner brake arm 6a is turned by the brake operating shaft 6 which is rotated by the brake arm 51, the engaging lug 6b rotates the actuator 2. This moves the small-diameter portions of the cam grooves 2a to the positions of the respective cam balls 38. Since the small-diameter portions are shallower than the large-diameter portions, the actuator 2 moves away from the stationary plate 1 with this movement by being pushed by the cam balls 38, pressing the pressure disk 5 against the brake disk 3 and the pressure disk 4. This exerts a braking force on the brake disk 3 rotating with the output shaft 8.

The pressure disk 5 can be dispensed with in the brake device. Yet the pressure disk 5 is advantageously provided in the brake device since the disk 5 can prevent the undesirable rotation of the actuator 2 and the actuation of the brake device which will occur due to the ingress of extraneous matter in the space between the brake disk 3 and the actuator 2.

Figure 4:
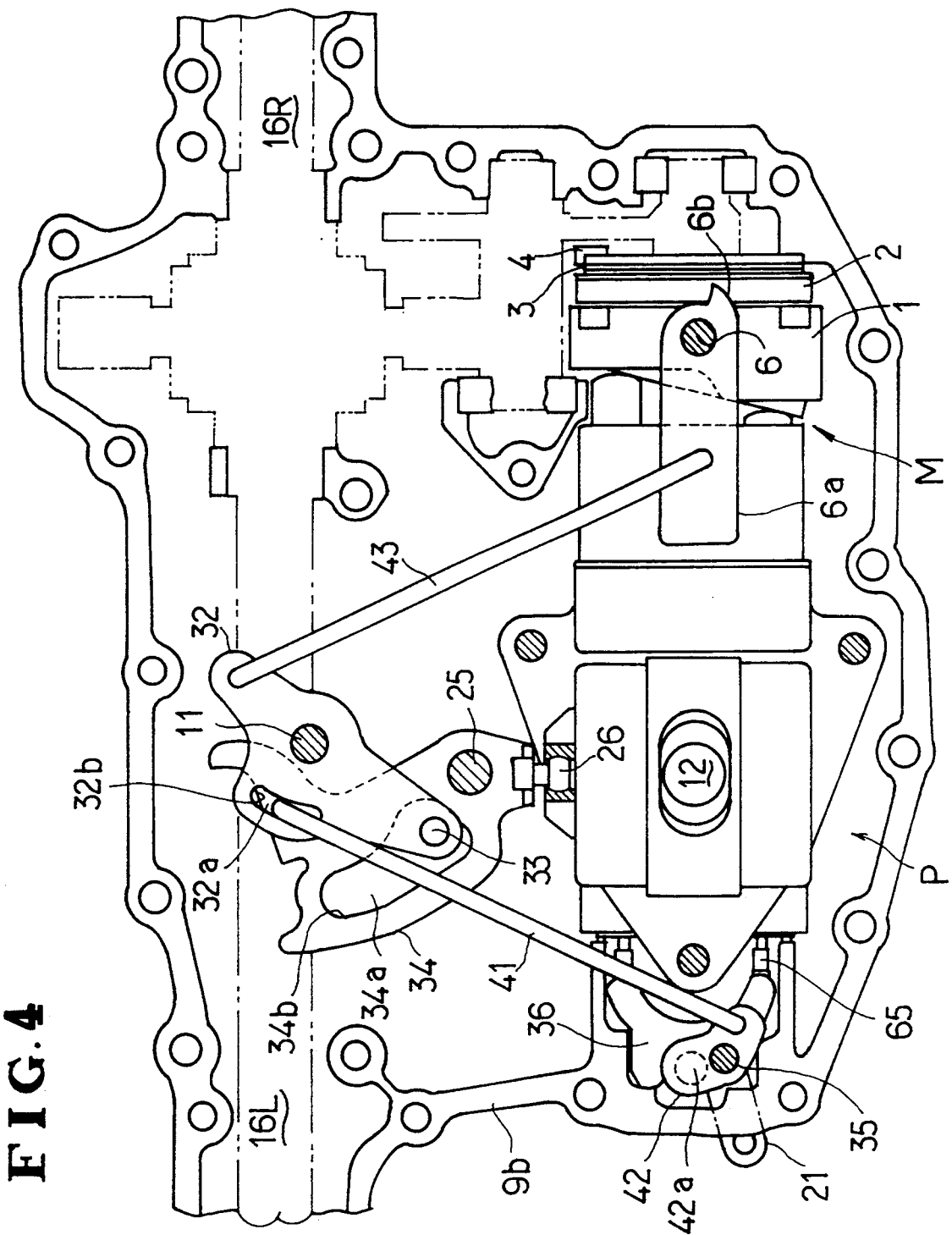
FIG. 4 is a plan view of the apparatus with the upper housing portion removed to chiefly show a mechanism for interlocking a brake device, bypass mechanism and hydrostatic speed-variable transaxle.

Next, a bypass mechanism will be described with reference to FIGS. 2 to 4. The closed circuit of the hydrostatic transmission includes a bypass channel, which is selectively held in an "open" state or "closed" state by a pair of bypass valves 65, 65 (only the push rods of the valves are shown in FIGS. 3 and 4) internally provided in the center support 15. The structure including these bypass valves is the same as the one disclosed in the U.S. Pat. No. 4,932,209. The lower housing portion 9b slidably guides and supports a pushing member 36 for advancing or retracting the bypass valves 65, 65 at the same time to bring them into the "open" or "closed" state. The bypass operating shaft 35, which is supported by the upper housing portion 9a, is fixedly provided with a bypass operating arm 21 disposed outside the housing and an interlocking arm 42 disposed inside the housing and extending from opposite sides of the shaft 35. A pin 42a is attached to one end of the arm 42 on the lower side thereof. When the interlocking arm 42 is rotated about the shaft 35 by a connecting rod 41 which will be described later, the pin 42a advances the pushing member 36 to open the bypass valves 65, 65, thereby rendering the hydraulic motor M idly rotatable. When the interlocking arm 42 is relieved of the rotating force, the pushing member 36 is retracted by a return spring (not shown) provided for each bypass valve 65, 65. A linkage extending from a bypass opening lever outside the housing to the bypass operating shaft 35 has detaining means (not shown), whereby the bypass valves are held "open" or "closed" even if the opening lever is released from the hand.

Next, a description will be given of a mechanism for interlocking the brake device, the bypass mechanism and the hydrostatic transmission. As shown in FIG. 4, one end of a connecting rod 43 is attached to the long portion of the inner brake arm 6a. In the vicinity of the speed change operating shaft 25, a support shaft 11 extends downward from the upper housing portion 9a, with a control plate 32 rotatably supported by the shaft 11. The other end of the connecting rod 43 is attached to the control plate 32. The control plate 32 is formed with a slot 32a with the connecting rod 41 engaging therein. The slot 32a has a length corresponding to the distance the engaging end of the connecting rod 41 moves with the rotation of the interlocking arm 42 for advancing and rectracting the pushing member 36.

The interlocking mechanism functions in the following manner. When the hydraulic pump is to exert its drive force on the hydraulic motor to drive a working vehicle, the bypass operating arm 21 is moved to rotate the bypass operating shaft 35 so that the pushing member 36 is retracted to bring the bypass valves 65, 65 into the "closed" state, whereby a closed circuit extending from the pump to the motor is formed. On the other hand, when the working behicle need not be driven as in the case where the main vehicle body draws the working vehicle, the bypass operating arm 21 is moved to advance the pushing member 36 and thereby bring the bypass valves 65, 65 into the "open" state. This opens the closed circuit, causing the circuit to communicate with the oil retained within the housing. Consequently, the oil is free to flow into or out of the hydraulic motor, which in turn becomes freely rotatable so as not to interfere with the rotation of the axle due to traction. The main vehicle body for supplying power to a working vehicle are generally so constructed that the engine can not be started up unless the brake pedal is in a depressed state. When the working vehicle is to be driven with the start of the engine in the case where the vehicle body is so constructed, the driver operates the brake operating means to actuate the brake device. This rotates the interlocking arm 42 at the same time through the connecting rod 43, control plate 32 and connecting rod 41, retracting the pushing member 36 to close the bypass valves 65, 65 even if these vales are in the "closed" state. Thus, the bypass valves 65, 65 always become closed upon the start of the engine. Accordingly, when the speed change arm 20 is moved to shift the speed change lever plate 34 from the neutral position to an operative position, the hydraulic motor can be rotated reliably to drive the working vehicle. When the bypass valves 65, 65 are in the "closed" state, the end of the connecting rod 41 engaging the control plate 32 is positioned at the remote end of the slot 32b and therefore will not interfere with the rotation of the control plate 32 during the operation of the brake device. Preferably, the slot 32a is given an allowance of length toward the end remote from the bypass device. Even if an increased stroke length is required for the operation of the brake device, for example, owing to wear on the brake disk 3 due to the use of the brake device for a prolonged period of time, the control plate 32 is then rotatable by an increased amount corresponding to the allowance without being restrained by the connecting rod 41.

An engaging roller 33 is rotatally supported by and extends downward from the control plate 32 at one end thereof opposite to the other end in engagement with the connecting rod 34. The roller 33 is engaged in a slot 34a in the speed change lever plate 34. The slot 34a has such a length that the engaging roller 33 is accommodated therein when the control plate 32 is in any rotated position while the brake device is in its nonoperative or operative state. The slot 34a has an enlarged width permitting the speed change operating shaft 25 to be rotated by the speed change arm 20 from the neutral position to a speed change position for driving the vehicle forward or rearward, with the brake device in its nonoperative state (state of FIG. 4). The slot 34a further has a reduced width at the portion thereof where the engaging roller 33 is positioned when the brake device is operated so as to forcibly rotate the speed change operating shaft 25 to the neutral position when the control plate 32 rotates clockwise in FIG. 4 with the brake device in its operative state. The width of the slot 34a gradually varies from the wide portion to the narrow portion to render the roller 33 smoothly movable. Preferably, the slot 34a is given an allowance of length at its end portion of reduced width. Even if an increased stroke length is required for the operation of the brake device, for example, owing to wear on the brake disk 3 due to prolonged use of the brake device, the control plate 32 is then rotatable by an increased amount corresponding to the allowance without being limited by the lever plate 34.

With the axle driving apparatus embodying the present invention, the brake operating shaft 6 is provided directly on the housing 9 as previously stated, so that the brake arm 51 coupled to the brake operating means can be attached directly to the shaft 6. Accordingly, the brake operating shaft 6 can be connected by a single connecting rod to the control plate 32 for coupling to the bypass mechanism. In this respect, the apparatus of the invention is simpler in construction than those wherein the brake operating shaft is provided outside the housing.

With reference to FIG. 2, a cooling fan 70 is mounted on the upper end of the input shaft 12 for applying a current of air to the housing portion covering the hydraulic pump P. As seen in FIG. 1, the upper housing portion 9a is provided with a tank portion 71 partly surrounding the cooling fan 70 and curved when seen from above. The tank portion 71 is slender in section, extends approximately to the same level as the fan 70 and has an interior space communicating with the interior of the housing 9. The tank portion 71 has an outward projection with an oil supply opening formed in its upper end and closed with a plug 72. The plug 72 has minute pores not permitting passage of oil but permitting air to flow therethrough to serve also as a breather. Thus, air is free to flow through the plug with a rise or fall of the oil level within the tank portion 71 due to the expansion or contraction of the oil which occurs depending on the oil temperature variable with the operative or inoperative state of the apparatus. The upper housing portion 9a has frames 22R, 22L attached to and extending upward from the right and left edges thereof, respectively. As shown in FIG. 1, the frames 22R, 22L extend upward beyond the cooling fan 70 and each have a lower end fastened to the upper housing portion 9a with bolts and an upper end to be fastened with bolts to the vehicle body on which the axle driving apparatus is to be mounted. Accordingly, the cooling fan 70 is generally surrounded by the tank portion 71 and the frame 22R. Consequently, the air current produced by the fan 70 efficiently reaches and cools the recessed housing portion covering the hydraulic pump P where heat generation and accumulation are most likely to occur.

I claim:

1. An axle driving apparatus comprising:
    a hydraulic pump having an input shaft for delivering pressure oil;
    a hydraulic motor driven by the pressure oil from the hydraulic pump;
    a housing supporting an axle immersed in oil retained inside the housing;
    a power transmission for operatively connecting an output shaft of the hydraulic motor to the axle; and
    a brake device in the housing, the brake device comprising:
        a brake disk fixed to and rotatable with one of the output shaft of the hydraulic motor and a rotary shaft of the power transmission;
        a first pressure disk disposed at one side of the brake disk and fixed to the housing;
        a second pressure disk supported on the other side of the brake disk for moving in a direction along the shaft having the brake disk fixed thereto and engaged with the housing for preventing rotation about the shaft having the brake disk fixed thereto;
        a stationary member fixed to the housing on one side of the brake disk and having the other side facing the second pressure disk;
        an actuator disposed between the second pressure disk and the stationary member for moving in a direction along the shaft having the brake disk fixed thereto and for rotating about the axis of the shaft having the brake disk fixed thereto;
        a cam mechanism provided on the actuator and the stationary member for moving the actuator toward the second pressure disk with the rotation of the actuator; and
        a brake operating shaft, supported by the housing, for rotating the actuator about the axis of the shaft having the brake disk fixed thereto, the brake disk, the first and second pressure disks and the actuator being immersed in the oil retained within the housing.

2. An axle driving apparatus as defined in claim 1 wherein the cam mechanism comprises a plurality of cam balls accommodated in and projecting from cavities provided on the stationary member and cam grooves provided on corresponding portions on the actuator, each groove having a drop form having a larger-diameter portion of great depth which continuously changes into a small-diameter portion of small depth.

3. An axle driving apparatus as defined in claim 1 wherein the housing comprises two portions separable along a plane containing the axis of the disk-having shaft, and the first and second pressure disks and the stationary member are fixed to the housing by being held between the two portions.

4. An axle driving apparatus as defined in claim 1 wherein the brake operating shaft extends orthogonal to the disk-having shaft and projects upward beyond the housing.

5. An axle driving apparatus as defined in claim 1 wherein the hydraulic motor is of the axial plunger piston type comprising pistons for moving into contact with a slanting surface of the stationary member, when projecting from a cylinder block to rotate the cylinder block and the output shaft, the cam mechanism being provided on the actuator and on a portion of the stationary member on opposite side to the slanting surface portion thereof.

6. An axle driving apparatus comprising:
    hydraulic pump having an input shaft for delivering pressure oil;
    an axial plunger piston type hydraulic motor driven by the pressure oil from the hydraulic pump;
    a housing supporting an axle immersed in oil retained inside the housing;
    a power transmission for operatively connecting an output shaft of the hydraulic motor to the axle; and
    a brake device in the housing, the brake device comprising:
        a brake disk fixed to and rotatable with one of the output shaft of the hydraulic motor and a rotary shaft of the power transmission;
        a pressure disk disposed at one side of the brake disk and fixed to the housing;
        a stationary member fixed to the housing and having a slanting surface, wherein the axial plunger piston type hydraulic motor comprises pistons for moving into contact with the slanting surface, when projecting from a cylinder block to rotate the cylinder block and the output shaft;

an actuator on the other side of the brake disk and supported by the housing for moving in a direction along the shaft having the brake disk fixed thereto and for rotating about the axis of the shaft having the brake disk fixed thereto;

a cam mechanism, provided on the actuator and on a portion of the stationary member on opposite sides to the slanting portion for moving the actuator toward the brake disk with the rotation of the actuator; and a brake operating shaft, supported by the housing, for rotating the actuator about the axis of the shaft having the brake disk fixed thereto, the brake disk, the pressure disk and the actuator being immersed in the oil retained within the housing.

* * * * *